(12) United States Patent
Cho et al.

(10) Patent No.: US 7,379,614 B2
(45) Date of Patent: May 27, 2008

(54) METHOD FOR PROVIDING SERVICES ON ONLINE GEOMETRIC CORRECTION USING GCP CHIPS

(75) Inventors: Seong Ik Cho, Taejon (KR); Jong Hyun Park, Taejon (KR); Youngbo Yun, Taejon (KR); Geun Won Yoon, Taejon (KR); Tae Hyun Hwang, Seoul (KR)

(73) Assignee: Electronics and Telecommunications Research Institute, Taejon (KR)

( * ) Notice: Subject to any disclaimer, the term of this patent is extended or adjusted under 35 U.S.C. 154(b) by 904 days.

(21) Appl. No.: 10/872,384

(22) Filed: Jun. 22, 2004

(65) Prior Publication Data

US 2005/0140784 A1 Jun. 30, 2005

(30) Foreign Application Priority Data

Dec. 26, 2003 (KR) ............... 10-2003-0097650

(51) Int. Cl.
*G06K 9/40* (2006.01)
(52) U.S. Cl. ............ 382/255; 382/276; 345/441; 345/619; 348/746; 348/806; 702/2; 709/203
(58) Field of Classification Search ........... 382/255
See application file for complete search history.

(56) References Cited

U.S. PATENT DOCUMENTS

| | | | | | |
|---|---|---|---|---|---|
| 5,124,915 | A | * | 6/1992 | Krenzel ............... | 702/5 |
| 5,187,754 | A | * | 2/1993 | Currin et al. ........ | 382/284 |
| 5,259,037 | A | * | 11/1993 | Plunk ................ | 382/154 |
| 5,596,494 | A | * | 1/1997 | Kuo .................. | 702/2 |
| 5,864,632 | A | * | 1/1999 | Ogawa et al. ........ | 382/113 |
| 5,943,137 | A | * | 8/1999 | Larson et al. ....... | 358/403 |
| 6,125,329 | A | * | 9/2000 | Place et al. ......... | 702/5 |
| 6,287,027 | B1 | * | 9/2001 | Komiya et al. ....... | 400/74 |
| 6,377,257 | B1 | * | 4/2002 | Borrel et al. ........ | 345/419 |
| 6,442,293 | B1 | * | 8/2002 | Ito et al. ............ | 382/154 |

(Continued)

FOREIGN PATENT DOCUMENTS

KR 1999-47500 7/1999

(Continued)

OTHER PUBLICATIONS

Hu, Y., Tao, V., "Updating solutions of the rational function model using additional control information", ASPRS Annual Conference, Apr. 23-27, 2001, St. Louis, 8p.*

(Continued)

*Primary Examiner*—Matthew C. Bella
*Assistant Examiner*—Sath V. Perungavoor
(74) *Attorney, Agent, or Firm*—Lowe Hauptman Ham & Berner LLP

(57) ABSTRACT

Disclosed is a method for providing services on online geometric correction using, in which information related with GCP (Ground Control Point) used for correcting geometric distortion of an image collected by an aircraft or a satellite are transmitted online through Internet network, thereby allowing a user at a remote place to perform geometric correction or ortho-rectification. In the geometric correction process, the image information related with the GCP is provided but the precise geographic coordinate of the GCP itself is not provided to thereby maintain the secretion of detailed geographic information.

11 Claims, 6 Drawing Sheets

U.S. PATENT DOCUMENTS

| | | | |
|---|---|---|---|
| 6,487,495 B1* | 11/2002 | Gale et al. | 701/209 |
| 6,683,957 B1* | 1/2004 | Shin | 380/54 |
| 6,757,445 B1* | 6/2004 | Knopp | 382/285 |
| 7,127,085 B2* | 10/2006 | Kim et al. | 382/113 |
| 7,171,328 B1* | 1/2007 | Walker et al. | 702/136 |
| 7,197,535 B2* | 3/2007 | Salesky et al. | 709/204 |
| 7,310,440 B1* | 12/2007 | Dolloff | 382/154 |
| 2002/0076085 A1* | 6/2002 | Shimazu | 382/100 |
| 2002/0180727 A1* | 12/2002 | Guckenberger et al. | 345/418 |
| 2003/0044085 A1* | 3/2003 | Dial et al. | 382/293 |
| 2004/0003052 A1* | 1/2004 | Yoda | 709/217 |
| 2004/0037451 A1* | 2/2004 | Kim et al. | 382/113 |
| 2004/0117358 A1* | 6/2004 | von Kaenel et al. | 707/3 |
| 2004/0120595 A1* | 6/2004 | Choi et al. | 382/254 |
| 2004/0122633 A1* | 6/2004 | Bang et al. | 703/2 |
| 2005/0147324 A1* | 7/2005 | Kwoh et al. | 382/293 |
| 2005/0288859 A1* | 12/2005 | Golding et al. | 701/211 |
| 2006/0041375 A1* | 2/2006 | Witmer et al. | 701/208 |
| 2006/0125821 A1* | 6/2006 | Shimazu | 345/419 |
| 2006/0262963 A1* | 11/2006 | Navulur et al. | 382/109 |
| 2007/0003118 A1* | 1/2007 | Wheeler et al. | 382/128 |
| 2007/0058717 A1* | 3/2007 | Chosak et al. | 375/240.08 |
| 2007/0110338 A1* | 5/2007 | Snavely et al. | 382/305 |
| 2007/0286526 A1* | 12/2007 | Abousleman et al. | 382/284 |

FOREIGN PATENT DOCUMENTS

| | | |
|---|---|---|
| KR | 2000-28182 | 8/2000 |
| KR | 2000-27857 | 10/2000 |
| KR | 2003-36988 | 5/2003 |
| KR | 2003-54662 | 7/2003 |

OTHER PUBLICATIONS

Tao, C. V., Y. Hu., "A comprehensive study of the rational function model for photogrammetric processing", 2001, Photogrammetric Engineering & Remote Sensing, 67(12): 1347-1357.*

Yoshikazu Iikura; "Automation of Precise Ortho-rectification of Landsat TM Images"; Sice 02-0127; Aug. 5-7, 2002; Osaka; pp. 1-3.

Taejung Kim, et al.; "Automatic Satellite Image Registration by combination of Matching and Random Sample Consensus"; IEEE Transations on Geoscience and Remote Sensing; vol. 41, No. 5; May 2003; pp. 1111-1117.

Chih-Li Chang, et al.; "A study of management system of the ground control point database for ROCSAT-2 Remote Sensing images"; GISdevelopment.net->AARS->ACRS 2002->Data Processing, Algorithm and Modeling; pp. 1-6.

* cited by examiner

FIG. 6

| SERIAL | GCP CHIP ID | IMAGE X | IMAGE Y |
|---|---|---|---|
| 1 | C-126-36-00387 | 135 | 52 |
| 2 | C-126-36-03419 | 294 | 13 |
| 3 | C-126-36-12384 | 83 | 349 |
| 4 | C-126-36-35613 | 452 | 123 |
| ... | ... | ... | ... |

| SERIAL | GCP CHIP ID | IMAGE X | IMAGE Y |
|---|---|---|---|
| 1 | C-126-36-00387 | 135 | 52 |
| 2 | C-126-36-03419 | 294 | 13 |
| 3 | C-126-36-12384 | 83 | 349 |
| 4 | C-126-36-35613 | 452 | 123 |
| ... | ... | ... | ... |

| SERIAL | GCP CHIP ID | IMAGE X | IMAGE Y |
|---|---|---|---|
| 1 | C-126-36-00387 | 135 | 52 |
| 2 | C-126-36-03419 | 294 | 13 |
| 3 | C-126-36-12384 | 83 | 349 |
| 4 | C-126-36-35613 | 452 | 123 |
| ... | ... | ... | ... |

— C20

| SERIAL | GCP X | GCP Y | GCP Z | IMAGE Y | IMAGE X |
|---|---|---|---|---|---|
| 1 | 300386.123 | 3000213.126 | 238 | 52 | 135 |
| 2 | 300445.237 | 3000102.928 | 175 | 13 | 294 |
| 3 | 300152.834 | 3000582.592 | 104 | 349 | 83 |
| 4 | 300605.925 | 3000302.395 | 57 | 123 | 452 |
| ... | ... | ... | ... | ... | ... |

— C30

METHOD FOR PROVIDING SERVICES ON ONLINE GEOMETRIC CORRECTION USING GCP CHIPS

BACKGROUND OF THE INVENITON

1. Field of the Invention

The present invention relates to a method for providing services on online geometric correction using ground control point (hereinafter referred to as 'GCP') chips, and more particularly, to a method allowing a correction equation for ortho-rectification and geometric correction of an object image to be calculated with hiding a precise geometric coordinate of GCP when online providing services on GCP chip image and supplementary information, which are used for geometric distortion correction of aerial photograph or satellite image, through Internet network in a client/server manner.

2. Description of the Related Art

In general, a conventional technology for performing geometric correction using a GCP chip image has a basic concept of providing entire GCP-relating information as one data unit such as a GCP chip image, a precise geographic coordinate, related supplementary information and the like listed in a user computer or a GCP server. Additionally, the conventional technology uses the provided GCP information to search a corresponding point of the GCP at an object image such that a correction formula necessary for geometric correction or ortho-rectification is calculated, and the correction formula is used to correct the object image.

Similarly, as a technology for building the GCP information as the GCP chip image, there are "A STUDY OF MANAGEMENT SYSTEM OF THE GROUND CONTROL POINT DATABASE FOR ROCSAT-2 REMOTE SENSING IMAGES" disclosed in "Proceedings of ACRS 2002" on November 2002, "AUTOMATION OF PRECISE ORTHO-RECTIFICATION OF LANDSAT TM-IMAGES" disclosed in "Proceedings of the $41^{st}$ SICE Annual Conference" in 2002, "AUTOMATIC SATELLITE IMAGE REGISTRATION BY COMBINATION OF MATCHING AND RAMDOM SAMPLE CONSENSUS" disclosed in "IEEE Transactions on Geoscience and Remote Sensing" on May 2003, and the like.

Further, as a technology for pursuing a convenience in correcting the object image by using the GCP information, there are Korean Patent Application No.: 1019970065942 entitled "SEMIAUTOMATIC ON-LINE GEOGRAPHIC CORRECTION METHOD" filed on 4 Dec. 1997, Korean Patent Application No.: 1020000027857 entitled "MAP MANUFACTURING METHOD USING IMAGE DATA OF SATELLITE" filed on $23^{rd}$ MAY 2000, Korean Patent Application No.: 1020010067944 entitled "PARAMETER CONVERTING APPARATUS AND METHOD FOR IMAGE MATCHING" filed on $1^{st}$ Nov. 2001, Korean Patent Application No.: 1020010084871 entitle "SENSOR MODELING METHOD OF SATELLITE IMAGE" filed on 26 Dec. 2001 and the like.

Further, as a technology for serving geographic information through an internet network, there are Korean Patent Application No.: 1020000028182 entitled "METHOD FOR SERVING GEOGRAPHIC INFORMATION USING INTERNET NETWORK" filed on $24^{th}$ May 2000 and the like.

Similarly, when one looks into a technology disclosed in a prior art or treatise, a conventional method is a method for building and serving the GCP-relating information as a database to only a limited user allowed to access precise coordinate information of the GCP in a network environment separated from an external, or for allowing a GCP database to be retained within a user's computer listing the object image. In case that the precise geographic coordinate of the GCP cannot be opened to the public due to limitations by security regulation for regulating limitations to opening of geographic information to the public, it is impossible for many and unspecified persons to share the GCP-relating information. Accordingly, the conventional method continues to have a drawback in that all users should build respective GCP databases adaptive to purposes of themselves. Further, the conventional method has a drawback in that it is impossible for the GCP relating information to be opened to the public to share and reuse information.

SUMMARY OF THE INVENTION

Accordingly, the present invention is directed to a method for providing services on online geometric correction using GCP chips that substantially obviates one or more problems due to limitations and disadvantages of the related art.

An object of the present invention is to provide a method for providing services on online geometric correction using GCP chips in which except for a precise geographic coordinate having a limitation in information disclosure owing to the security regulation, contents recorded in the general GCP record, such as GCP chip image, an on-spot observatory photograph, an on-spot descriptive record, etc., which are remainder information related with the GCP, are all disclosed, thereby allowing unspecified persons to share or re-use information with one another through utilization of disclosure information related with the GCP.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for providing services on online geometric correction using ground control point ('GCP') chips, the method comprising the steps of: (a) when communication starts between a client of a user computer and a GCP server managing a GCP chip database, providing the GCP server with a spatial range information of an object image for correction; (b) reporting GCP chip image and supplementary information relating with the object image to the client; (c) searching a corresponding point from the object image using the GCP chips; (d) providing the corresponding information to the GCP server; (e) calculating a correction equation for geometric correction or ortho-rectification concurrently using the provided information and precise geographic coordinate information of the GCP; (f) reporting the calculated correction equation to the client; and (g) performing a correction of the object image using the correction equation and the object image and then ending the communication between the GCP server and the client.

In another aspect of the present invention, there is provided a recording medium storing a computer program for implementing a method for providing services on online geometric correction using GCP chips.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention.

In the drawings:

FIG. 6 is a table illustrating a relationship between the GCP of FIG. 2 and an object image for correction;

FIG. 7 is a table illustrating interference and interaction between the geographic coordinate database of FIG. 2 and the GCP chip database; and FIG. 8 is one example of providing corresponding point information by FIG. 2, and illustrates the corresponding point information provided to the GCP server by a client and corresponding point information finally transformed at the GCP server.

DETAILED DESCRIPTION OF THE INVENTION

Reference will now be made in detail to the preferred embodiments of the present invention, examples of which are illustrated in the accompanying drawings.

Figure 1:
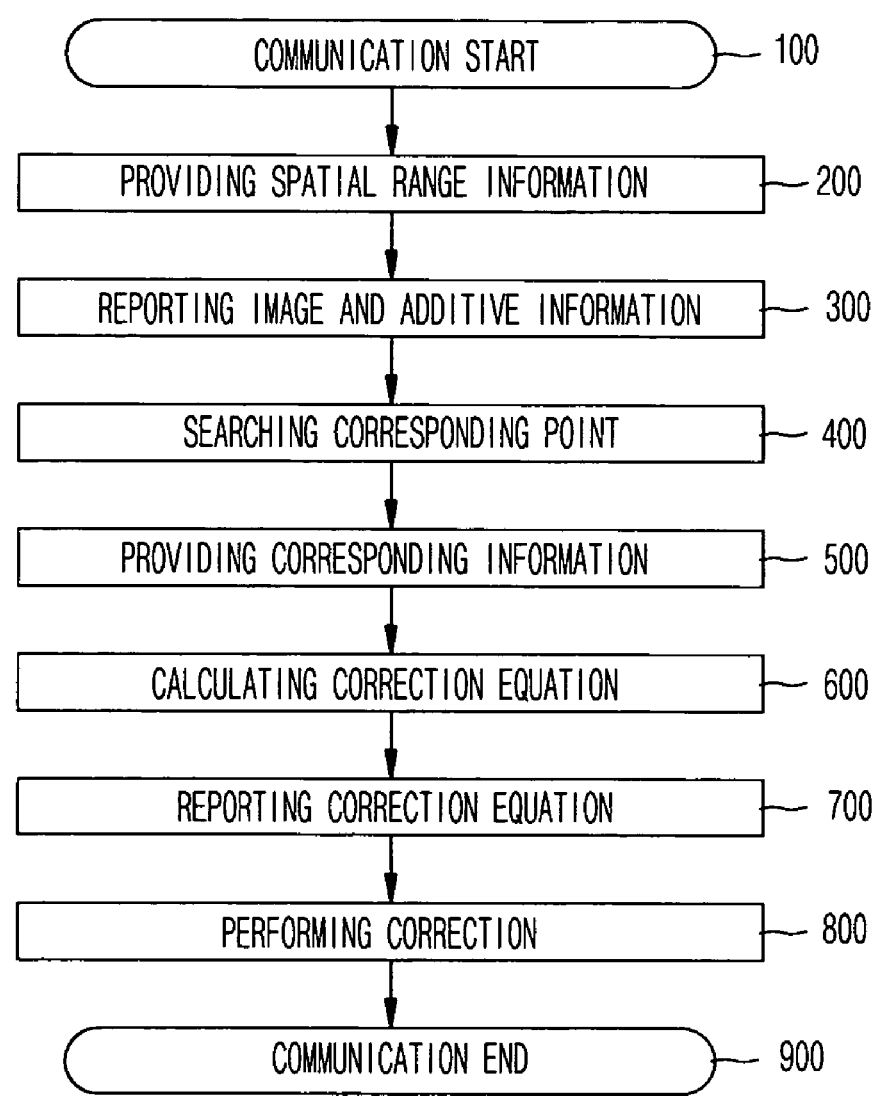
FIG. 1 is a flow chart illustrating a method for providing services on online geometric correction of aerial photograph or satellite image using GCP chips according to an embodiment of the present invention.

FIG. 1 is a flow chart illustrating a method for providing services on online geometric correction of aerial photograph or satellite image using GCP chips according to an embodiment of the present invention. Referring to FIG. 1, the services providing method includes: a communication start step 100; a spatial range information providing step 200; an image and supplementary information reporting step 300; a corresponding point searching step 400; a corresponding point information providing step 500; a correction equation calculating step 600; a correction equation reporting step 700; a correction performing step 800; and a communication end step 900.

Figure 2:
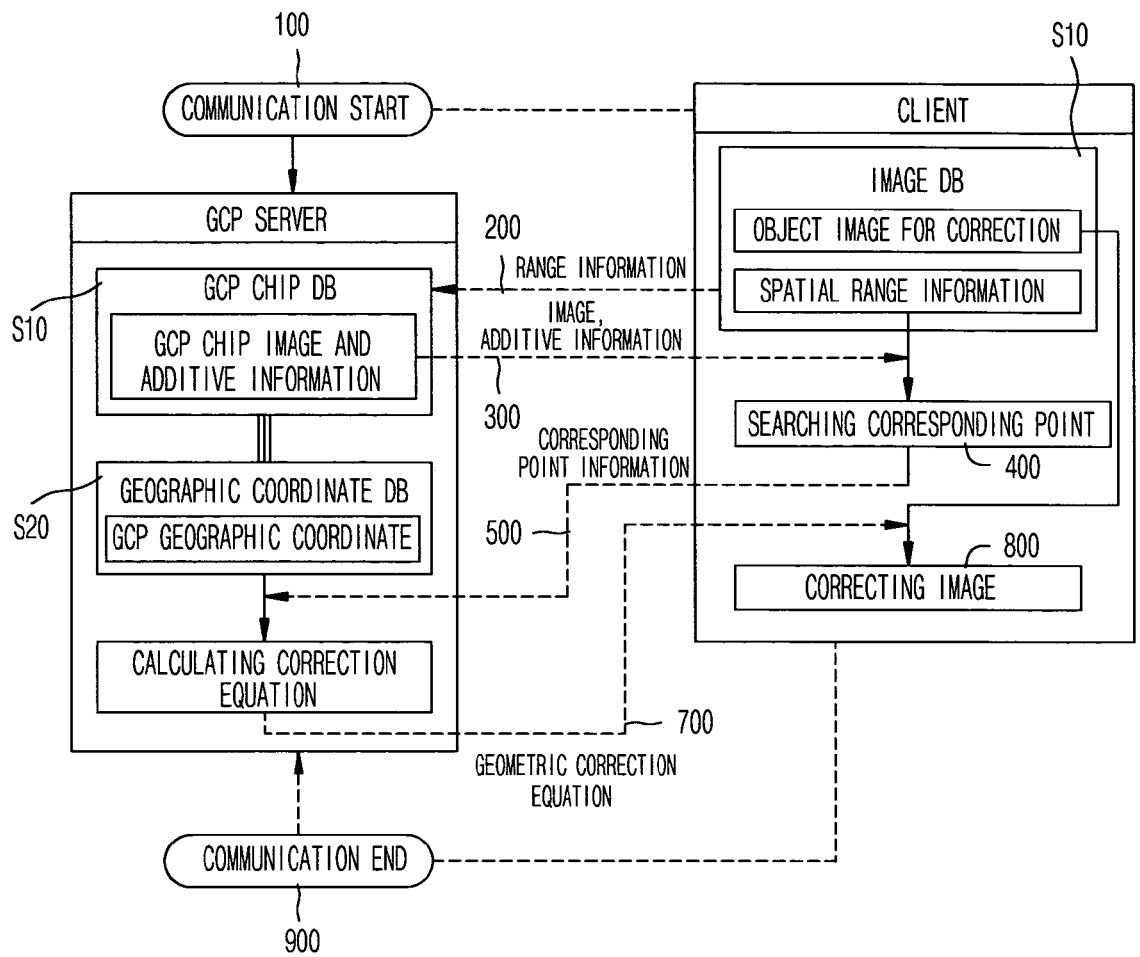
FIG. 2 is a schematic view illustrating information swap and processing sequence between a GCP server and a client.

The information swap and processing sequence between a GCP server and a client can be depicted as shown in FIG. 2 by making the process flow from the communication start step 100 to the communication end step 900 in a client-server structure. Especially, FIG. 2 is used for representing the same processing flow as that of FIG. 1.

The communication start step 100 corresponds to a step that the client of a user computer at a remote place transmits an access request signal according to a prescribed protocol, to the GCP server connected through Internet network, receives connection admission and starts a communication for online geometric correction.

As shown in FIG. 2, the spatial range providing step 200 is a step that the client sends information such as a schematic spatial range and a resolution of an object image for correction included in an image database C10 managed by the client to the GCP server, and accordingly, the GCP server searches a GCP chip database S10 to perform a search for individual information unit interacted with the GCP satisfying the spatial range and the resolution of the object image for correction provided by the client.

Figure 3:
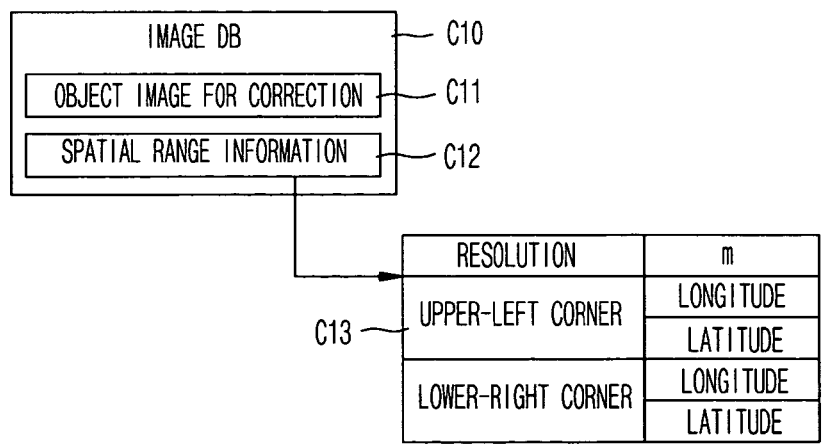
FIG. 3 is a schematic view illustrating the image database (C10) depicted in FIG. 2.

As shown in FIG. 3, the image database C10 managed by the client includes the object image for correction C11, the spatial range information C12 and so forth. One modified example C13 of the spatial range information includes information such as the resolution of the object image for correction expressed in metric unit (m), and a longitude and latitude coordinate of an upper-left corner and a lower-right corner. Accordingly, range information included in the modified example C13 of the spatial range information corresponds to one example of information that the client provides for the GCP server.

Figure 4:
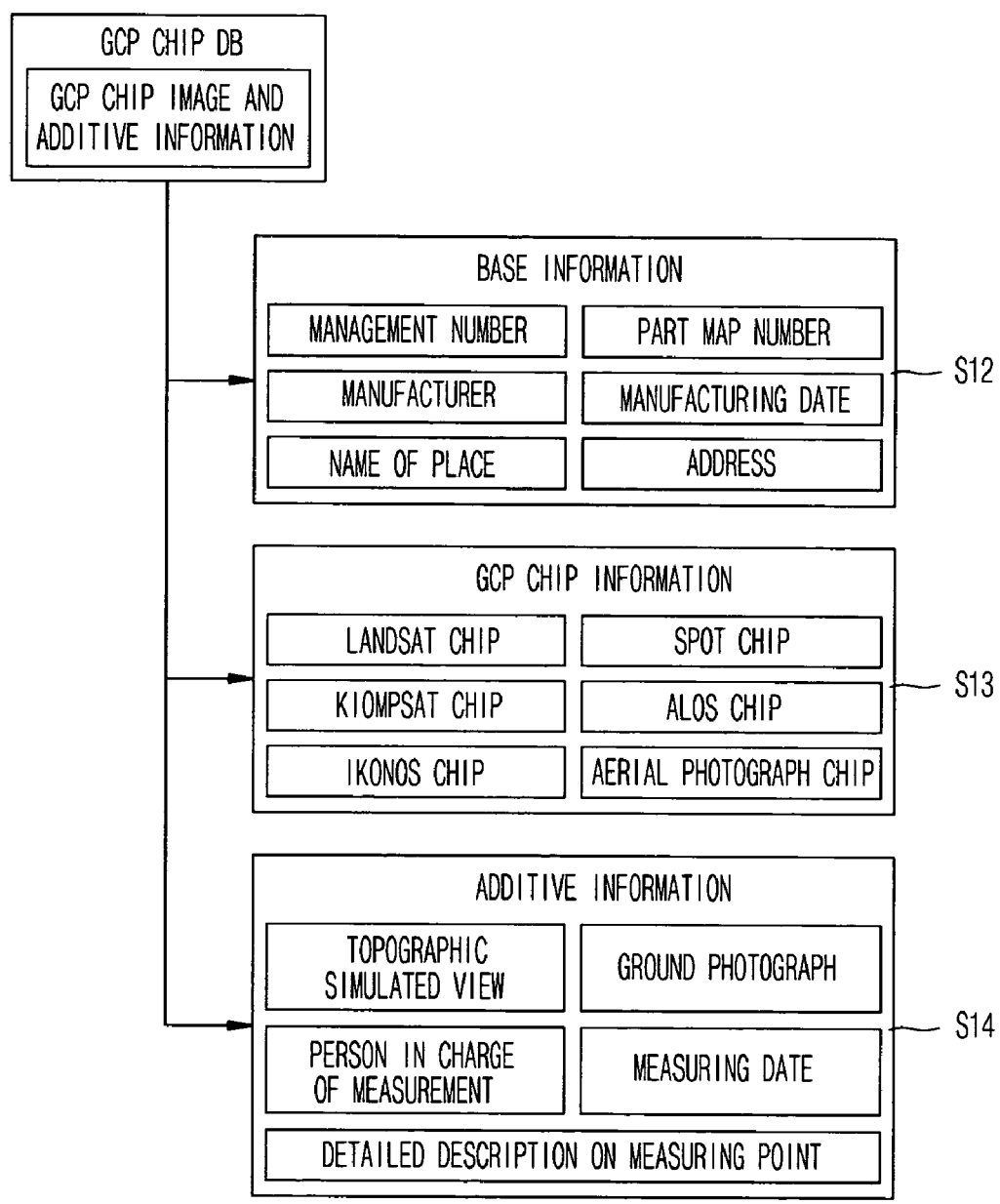
FIG. 4 is a schematic view illustrating the GCP chip database (S10) depicted in FIG. 2.

Further, as shown in FIG. 4, the GCP chip database S10 managed by the GCP server includes GCP chip image and supplementary information S11. One example of information S11 can be comprised of a base information S12, a GCP chip information S13 and an supplementary information S14. As shown in FIG. 4, the base information S12 can include a serial number of the GCP, a serial number of map including the GCP, a person in charge and a date and time of manufacturing GCP relating information, a name of the place representing the GCP, an address of the GCP or its adjacent address, and the like. The GCP chip information S13 can include the GCP chip information that can be generated from various image sources such as Landsat chip made by extracting a GCP-including region from a Landsat image having a resolution of 30 m, SPOT chip made by extracting from a SPOT region having a resolution of 10 m, KOMPSAT chip made by extracting from a KOMPSAT image having a resolution of 6.6 m, ALOS chip made by extracting from an ALOS image having a resolution of 2.5 m, IKONOS chip made by extracting from an IKONOS image having a resolution of 1 m, an aerial photograph chip made by extracting from an aerial photograph or so. The supplementary information S14 can include information such as a topographical simulation view simulating a topography around the GCP for easy recognition, an on-spot ground photograph around the GCP or an on-spot photograph of a perceivable facility adjacent to the GCP, a person in charge of or a date and time of measuring a precise geographical coordinate of the GCP, and a detailed description for a position where the GCP is measured.

The image and supplementary information reporting step 300 is a step of reporting the GCP chip image and supplementary information S11 as an individual information unit being a searched result, to the client.

Figure 5:
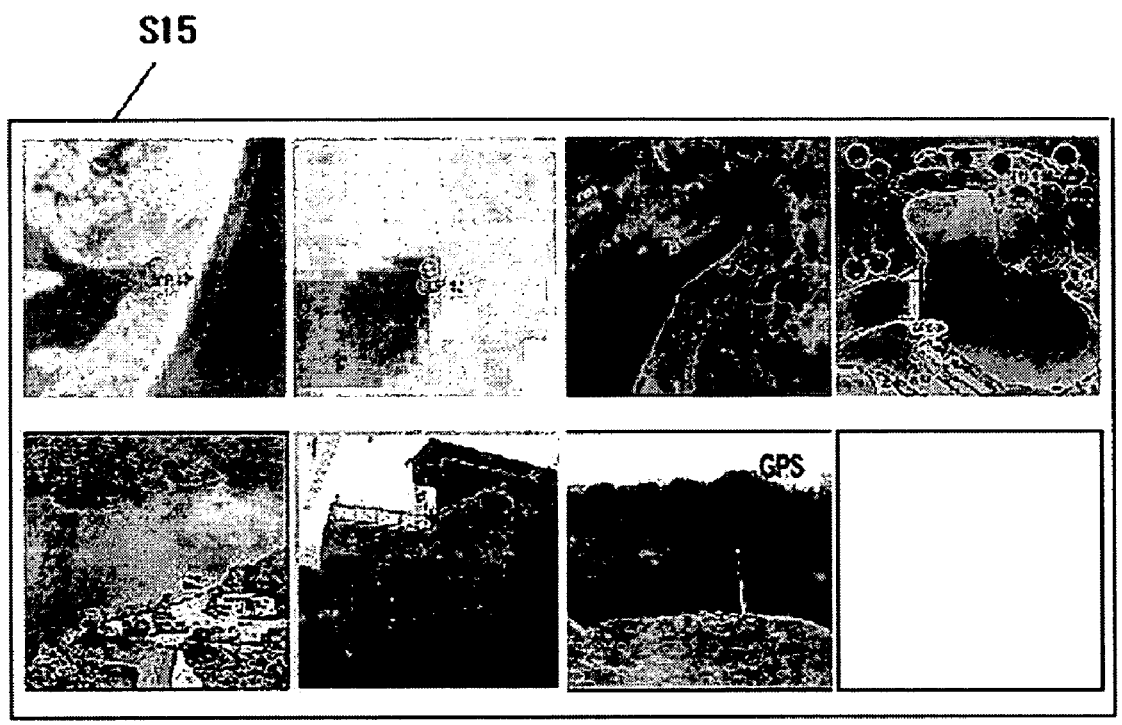
FIG. 5 is one example illustrating the GCP chip image and supplementary information (S11), and shows the GCP record.

Herein, one modified example where the GCP chip image and supplementary information S11 by FIG. 4 is reported to the client to be in detail shown for the user can become a GCP record S15 as shown in FIG. 5. Further, it can include information such as the GCP chip extracted from a satellite photograph or the aerial photograph, the topographic simulation view, an on-spot ground photograph and a detailed description for a measured position, but cannot include the precise geographic coordinate information going beyond a level of schematic coordinate information on the measured position that can be opened to the public within an allowable limit of the security regulation of the geographic information.

The corresponding point searching step 400 is a step of searching a specific measured position represented by the GCP chip image and supplementary information S11 reported by the GCP server, from the object image for correction C11 included in the image database C10 of the client, and then establishing a correspondence relationship between the indicator representing the GCP and a pixel coordinate of the object image for correction. The correspondence relationship is established for all or some information units transmitted from the GCP server. Since one modified example of the indicator delegating the GCP can be the serial number of GCP chip and the like as shown in FIG. 6, the established correspondence relationship C20 can be represented as a relationship between the serial number of GCP chip and the pixel coordinate of the object image for correction.

The corresponding point information providing step 500 is a step of sending the correspondence relationship C20 established through the searching step 400, to the GCP server, and accordingly, allowing the GCP server to search the geographic coordinate database S20 to convert information of the indicator included in the correspondence relationship C20 into the GCP coordinate such that the correspondence relationship expressed by the geographic coordinate of the GCP and the image coordinate of the object image as two coordinate system is generated.

Herein, since the GCP chip database S10 managed by the GCP server is interacted with the geographic coordinate database S20 as shown in FIG. 7, the serial number of GCP chip given as the indicator representing information of the GCP by the GCP chip database S10 is used to search the geographic coordinate database S20 such that the geographic coordinate S22 of the GCP can be obtained. At this time, since the geographic coordinate database S20 is interacted just only with the GCP chip database S10 through the indicator of the GCP within the GCP server, the geographic coordinate S22 of the GCP provided for the geographic coordinate database S20 has secretion to the client. That is, the client can accomplish secretion of the geographic coordinate satisfying the determined security regulation since it can view the image of the GCP chip provided by the GCP server, but cannot recognize the geographic coordinate of the GCP chip.

Accordingly, the correspondence relationship C20 at the client expressed using the indicator of the GCP and the pixel coordinate of the object image for correction is changed into a new correspondence relationship at the GCP server expressed using the geographic coordinate of the GCP and the pixel coordinate of the object image for correction by using interaction between the GCP chip database S10 and the geographic coordinate database S20 as shown in FIG. 8. Since the above new correspondence relationship exists only within the GCP server, the precise geographic coordinate information of the GCP can be secreted to the client.

The correction equation calculating step 600 is a step of calculating a geometric correction equation or an ortho-rectification equation as a formula for allowing the GCP server to provide a relation between the geographic coordinate of the GCP and the image coordinate of the object image for correction expressed using the correspondence relationship S30.

Herein, general modeling for establishing a relationship between the GCP representing a specific position on ground and the corresponding point representing a specific pixel existing at an image can be expressed as a Rational Function Model (RFM) defined by a ratio of two polynomials.

$$r_n = \frac{P_1(x_n, y_n, z_n)}{P_2(x_n, y_n, z_n)}$$

$$c_n = \frac{P_4(x_n, y_n, z_n)}{P_3(x_n, y_n, z_n)}$$

Equation 1

Where $r_n$ and $c_n$ respectively represent column position and row position of a specific pixel existing in an image, and $(x_n, y_n, z_n)$ represents a three dimensional coordinate of a specific position existing in the ground.

Meanwhile, the polynomial corresponding to numerator or denominator of equation 1 can be expressed by the below equation 2:

$$P_1(x, y, z) = \sum_{i=0}^{m_1} \sum_{j=0}^{m_2} \sum_{k=0}^{m_3} a_{ijk} x^i y^j z^k$$

$$= a_0 + a_1 x + a_2 y + a_3 z +$$

$$a_4 xy + a_5 xz + a_6 yz + a_7 x^2 + a_8 y^2 + a_9 z^2 +$$

$$a_{10} xyz + a_{11} x^2 y + a_{12} x^2 z + a_{13} y^2 x +$$

$$a_{14} y^2 z + a_{15} z^2 x + a_{16} z^2 y +$$

$$a_{17} x^3 + a_{18} y^3 + a_{19} z^3 \ldots$$

Equation 2 where $x_{ijk}$ is a coefficient of a polynomial expression called RFC (Rational Function Coefficients).

Since the polynomial of equation 2 is configured to accommodate the distortion due to various reasons—such as projection by optical axis, earth curvature, air refraction, lens distortion and so forth, it can be used to calculate a coefficient of a correction equation for ortho-rectification or geometric correction.

The correction equation reporting step 700 corresponds to a step of reporting the calculation results of the correction equation by the GCP server, to the client. In this reporting step 700, it is necessary to report only a value of a coefficient represented by the correction equation that can be expressed by the equation 1, to the client.

The correction performing step 800 corresponds to a step to perform geometric correction or ortho-rectification of an image by applying the correction equation transmitted from the GCP server to the object image C11 for correction, which is located in the image database C10 of the client. The performing of the correction work results in a new image of which geographic position is adjusted by the GCP.

Finally, the communication end step 900 corresponds to a step to end the communication between the GCP server and the client after the correction is completed.

The method for providing services on online geometric correction using GCP chips according to the present embodiment, can be manufactured in a computer program and the manufactured computer program can be stored in a storage medium such as hard disc, floppy disc, optical-magnetic disc, CD-ROM, ROM, RAM, etc.

As described previously, the inventive method for providing services on online geometric correction using GCP chips is characterized in that the GCP chip image and supplementary information contained in the spatial range of the object image for correction for the communication between the client and the GCP server is transmitted from the GCP server to the client but the information on a precise geographic coordinate of the GCP itself is not transmitted. As the client compares the object image for correction with the GCP chip image, searches for a pixel corresponding to the GCP from the object image, establishes a matching relation between the GCP and the object image and transmits the results to the GCP server, the GCP server can interrelate the matching relation transmitted from the client with the geographic coordinate database to establish a matching relation between the coordinate of the GCP and the coordinate of the object image. As a result, it becomes possible to calculate a correction equation for the geometric correction or ortho-rectification inside the GCP server. Since the coefficient of the correction equation obtained from the calculation is transmitted to the client and used to correct the object image, the inventive method can provide services on online geometric correction without disclosing the precise geographic coordinate of the GCP that is geographic information having a limitation in information disclosure owing to the security regulation, in spite that the GCP chip image and supplementary information are disclosed to unspecified persons compared with the conventional art.

The above description is only one embodiment to embody a method for providing services on online geometric correction using GCP chips. It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for providing services on online geometric correction using ground control point ('GCP') chips, the method comprising the steps of:
   (a) when communication starts between a client of a user computer and a GCP server managing a GCP chip database, providing the GCP server with a spatial range information of an object image for correction;
   (b) reporting GCP chip image and supplementary information relating with the object image to the client;
   (c) searching a corresponding point from the object image using the GCP chips;
   (d) providing the corresponding information to the GCP server;
   (e) calculating a correction equation for geometric correction or ortho-rectification concurrently using the provided information and precise geographic coordinate information of the GCP;
   (f) reporting the calculated correction equation to the client; and
   (g) performing a correction of the object image using the correction equation and the object image and then ending the communication between the GCP server and the client.

2. The method of claim 1, wherein the spatial range information of the step (a) comprises resolution of the object image for correction, and geographic coordinates of four corners.

3. The method of claim 1, wherein the GCP chip image and supplementary information of the step (b) comprise a base information, a GCP chip information and supplementary information.

4. The method of claim 3, wherein the base information comprises a serial number of the GCP, a serial number of map including the GCP, manufacturer and manufactured date and time of information related with the GCP, a name of the place representing the GCP, and an address of the GCP or an address of an adjacent place, the GCP chip information comprises a satellite image chip made by extracting a region including the GCP from a satellite image, and an aerial photograph chip made by extracting a region from an aerial photograph, and the supplementary information comprises a topographical simulation view simulating a topography around the GCP, an on-spot ground photograph around the GCP or an on-spot photograph of a perceivable facility adjacent to the GCP, a person in charge or manufactured date and time of precise geographical coordinate of the GCP, and description on a place where the GCP is measured.

5. The method of claim 1, wherein the searching step (c) of the corresponding point comprises the steps of:

searching a specific measuring position indicated by the GCP chip image and supplementary information reported by the GCP server, from the object image for correction; and establishing a correspondence relationship between an indicator representing the GCP and an image coordinate of the object image for correction.

6. The method of claim 1, wherein in the calculating step (e) of the equation for the geometric correction or ortho-rectification, the relationship between the GCP and the corresponding point representing a specific pixel is modeled by a below equation:

$$r_n = \frac{P_1(x_n, y_n, z_n)}{P_2(x_n, y_n, z_n)} \quad \text{Equation 1}$$

$$c_n = \frac{P_4(x_n, y_n, z_n)}{P_3(x_n, y_n, z_n)}$$

where $r_n$, $c_n$ are respectively column position and row position of the specific pixel existing in the image, and $(x_n, y_n, z_n)$ is a three-dimensional coordinate of a specific position existing in ground.

7. A computer readable medium storing a computer program for implementing method for providing services on online geometric correction using ground control point ('GCP') chips including the function recited in claim 1.

8. A computer readable medium storing a computer program for implementing method for providing services on online geometric correction using ground control point ('GCP') chips including the function recited in claim 2.

9. A computer readable medium storing a computer program for implementing method for providing services on online geometric correction using ground control point ('GCP') chips including the function recited in claim 3.

10. A computer readable medium storing a computer program for implementing method for providing services on online geometric correction using ground control point ('GCP') chips including the function recited in claim 4.

11. A computer readable medium storing a computer program for implementing method for providing services on online geometric correction using ground control point ('GCP') chips including the function recited in claim 5.

* * * * *